United States Patent
DiStefano

(10) Patent No.: US 7,288,918 B2
(45) Date of Patent: Oct. 30, 2007

(54) WIRELESS BATTERY CHARGER VIA CARRIER FREQUENCY SIGNAL

(76) Inventor: Michael Vincent DiStefano, 37 Hillcrest Rd., Martinsville, NJ (US) 08836

( * ) Notice: Subject to any disclaimer, the term of this patent is extended or adjusted under 35 U.S.C. 154(b) by 171 days.

(21) Appl. No.: 10/790,000

(22) Filed: Mar. 2, 2004

(65) Prior Publication Data
US 2005/0194926 A1   Sep. 8, 2005

(51) Int. Cl.
*H01M 10/46* (2006.01)
(52) U.S. Cl. .................................. 320/108
(58) Field of Classification Search ............ 320/107, 320/108, 109, 114; 455/39, 41.1
See application file for complete search history.

(56) References Cited

U.S. PATENT DOCUMENTS

| | | | | |
|---|---|---|---|---|
| 4,685,047 A | * | 8/1987 | Phillips, Sr. ............... 307/151 |
| 5,503,350 A | * | 4/1996 | Foote ................ 320/DIG. 33 |
| 5,733,313 A | * | 3/1998 | Barreras et al. ............. 607/33 |
| 5,982,139 A | * | 11/1999 | Parise ....................... 320/109 |
| 6,127,799 A | * | 10/2000 | Krishnan .................. 320/104 |
| 6,275,681 B1 | * | 8/2001 | Vega et al. ................ 455/41.1 |
| 6,967,462 B1 | * | 11/2005 | Landis ...................... 320/101 |

* cited by examiner

*Primary Examiner*—Edward H. Tso
(74) *Attorney, Agent, or Firm*—Day Pitney LLP

(57) ABSTRACT

Apparatus and methods to wirelessly charge batteries within a radius of a power source. A power transmitter generates a power signal of specific configuration which is received by the power charger. The power charger harvests the received power signal and stores the energy contained within for the purpose of charging target battery or batteries.

The typical uses of this invention are but not limited to the home, car, office, and work place. Anywhere where rechargeable batteries are used in a device where they need to be placed or physically removed from the device for recharge by conventional wired chargers, this invention provides method to prolong battery life in such a way to extend the time between a physical wired recharge or eliminate such events all together.

14 Claims, 2 Drawing Sheets

US 7,288,918 B2

WIRELESS BATTERY CHARGER VIA CARRIER FREQUENCY SIGNAL

FIELD OF THE INVENTION

The present invention relates to charging batteries and in particular, to transmitting a carrier signal from a power source to a receiver which store the energy.

BACKGROUND OF THE INVENTION

Many commonly used items require batteries. The two most common battery types are disposable and rechargeable. If a device uses a rechargeable battery, the device must be physically plugged into a charging receptor for recharge. Depending on the intended use of the device, it is often desirable to use the device with rechargeable batteries; however, it is not always convenient to worry about plugging in the device for recharging.

Nikola Tesla described the effects of transmitting energy through natural media, the basis for all radio transmissions. The present invention uses the principals set forth in his work for the specific purpose of harvesting the power of a transmitted power signal to charge batteries.

It is therefore an object of this invention to reduce or eliminate the need for a physical connection when recharging batteries by establishing a process for wirelessly charging batteries within a predetermined radius of a power transmitter.

SUMMARY OF THE INVENTION

In accordance with the present invention, there is provided a process and electrical circuitry to wirelessly transmit a power signal. The power signal is received by a receiver that stores energy for the purpose of charging one or more batteries. The transmitted power signal is configured to reduce interference with other wireless signals in the vicinity of the power transmitter and receiver.

BRIEF DESCRIPTION OF THE DRAWINGS

A complete understanding of the present invention may be obtained by reference to the accompanying drawings, when considered in conjunction with the subsequent, detailed description, in which.

DESCRIPTION OF THE PREFERRED EMBODIMENT

Figure 1:
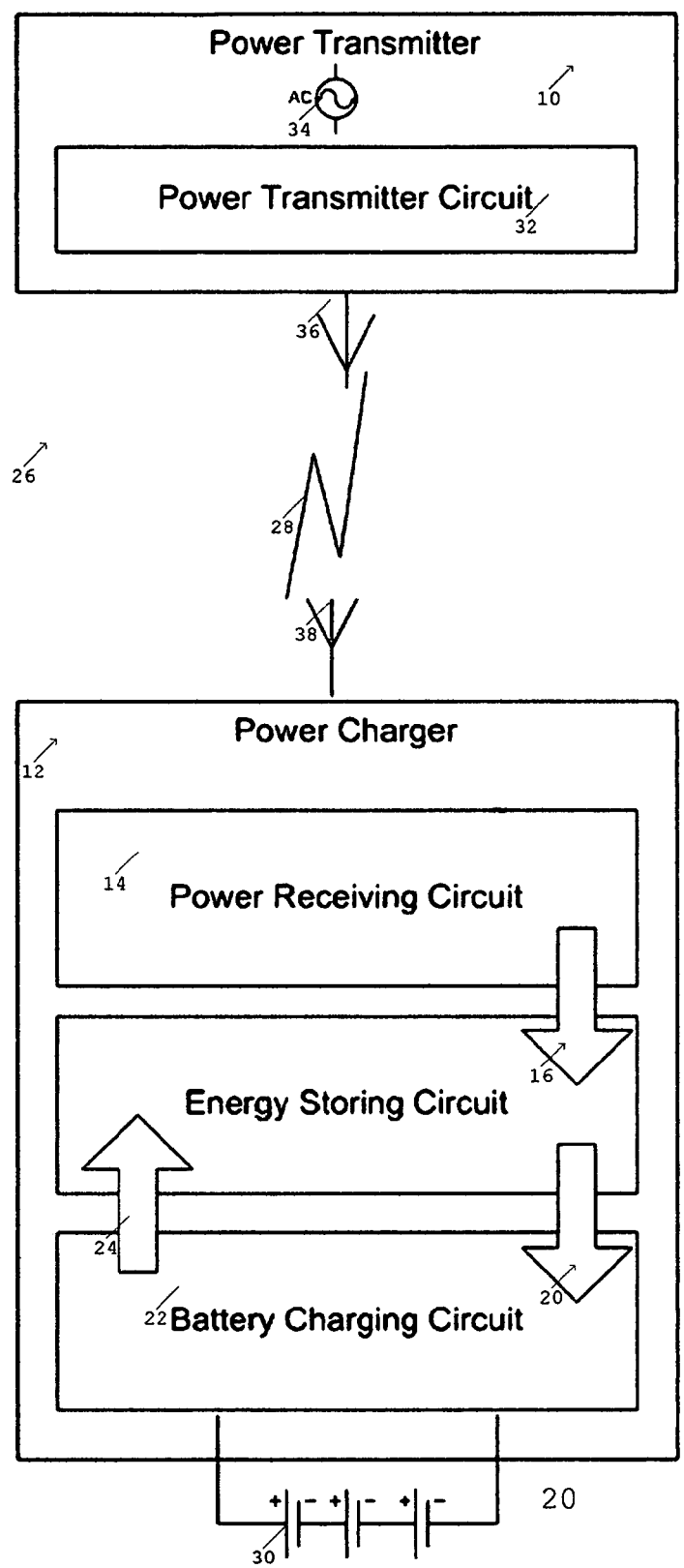
FIG. 1 is a block diagram view of a wireless battery charger system in accordance with the present invention.

FIG. 1 is a block diagram of a wireless battery charger 26. There are two main components: a power transmitter 10 and a power charger 12.

Figure 2:
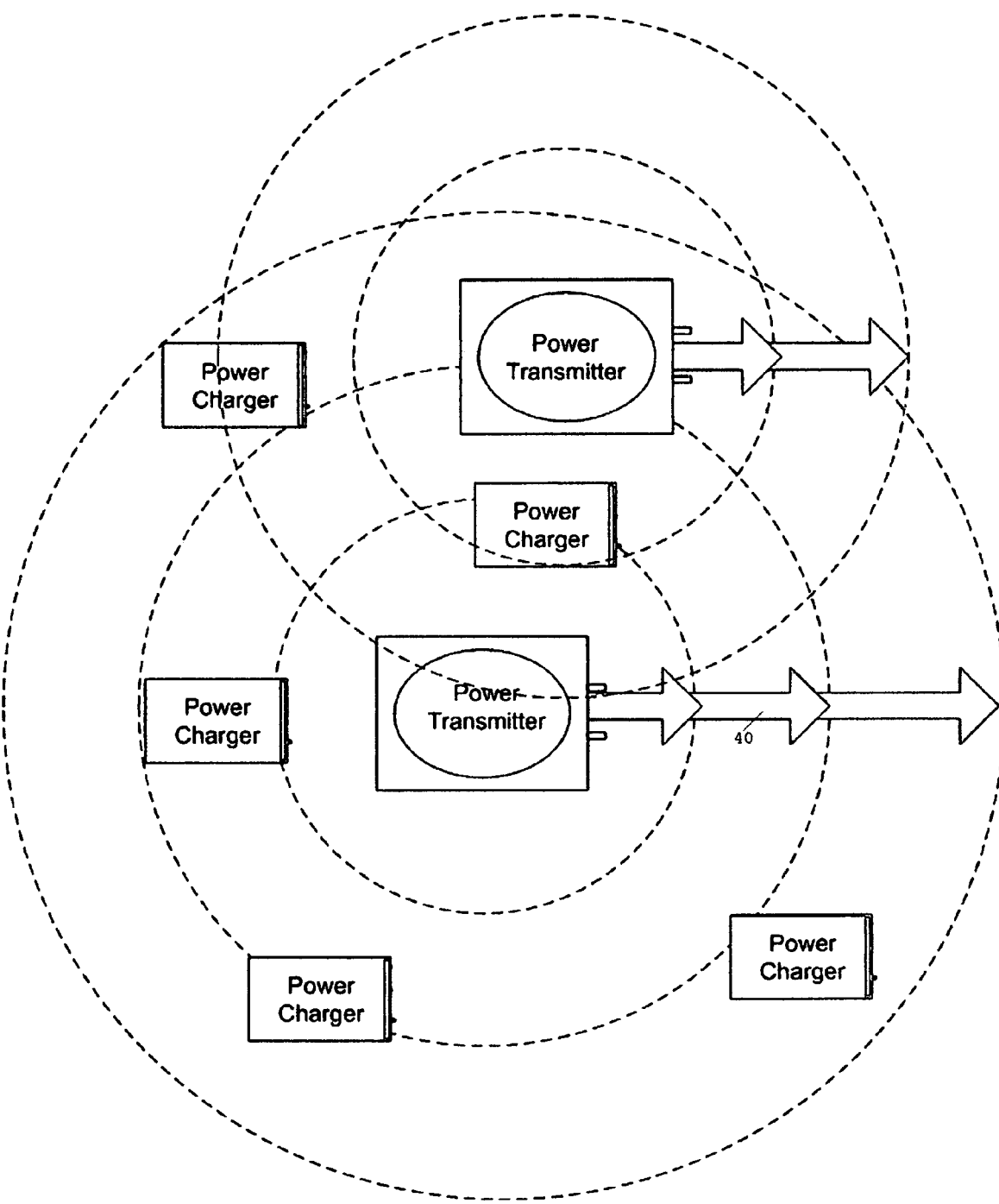
FIG. 2 is a block diagram view of an effective radius between any one power charger and power transmitter For purposes of clarity and brevity, like elements and components will bear the same designations and numbering throughout the FIGURES.

The structural and operational parameters of the power transmitter 10 and power charger 12 are as follows: the power transmitter 10 is, fundamentally, radio frequency transmitter. The transmitted signal is the Power Signal 28 described hereafter. The power rating and transmitted frequency of the Power Signal 28 must be within the legal and health safety limits set forth by the appropriate government bodies. The power charger 12 must operate under the basic principal of expending less energy to harvest the Power Signal 28 than the total energy available of the received Power Signal 28. The physical dimensions of the power transmitter 10 can be as small as the prevailing technology permits to generate the desired Power Signal 28. The physical dimensions of the power receiver can be as small as the prevailing technology permits. There is no constraint to ratio of power transmitter 10 to power receivers. There may be a many to many ratio of power transmitter 10 to power charger 12 as shown in FIG. 2.

The effective charging radius 40 or maximum distance between the power transmitter 10 and power charger 12 is dependant on the power rating of the transmitted Power Signal 28 and the energy difference of the harvested energy of the received Power Signal 28 at the power charger 12 and the minimum energy requirements to apply a charge to the batteries 30.

The power transmitter 10 contains a Power Transmitter Circuit 32 described in great detail hereafter, that generates a signal of specified power rating, carrier frequency, and possible frequency and phase modulations to transmit a Power Signal 28. A transmitter antenna 36 is electrically connected to the Power Transmitter Circuit 32. A Power Signal 28 uses a carrier frequency to reduce interference with other transmitted signals from other devices that broadcast/receive on other dedicated frequencies, such as wireless phones, networks, etc. If necessary, additional modulation schemes i.e. frequency shifting and phase modulations) can be added to the Power Signal 28,in ways well known to those skilled in the art, to reduce cross band interference.

The power transmitter 10 connects to a power source 34 such as, but not limited to, a standard AC electrical outlet. The power source 34 is the source of the power needed to transmit the Power Signal 28.

The power charger 12 receives the Power Signal 28 and uses it to charge target batteries 30. This is a multi-stage process, starting with receiving the Power Signal 28, then storing the energy of the received signal until sufficient quantities are reached to effect a charge to the target batteries 30.

The first stage of the inventive process uses the Power Receiving Circuit 14. The Power Signal 28 is received via a receiving antenna 38 disposed in or in electrical contact with the power charger 12. The appropriate signal filtering is applied to ensure proper receipt of the Power Signal 28. The Power Signal 28 is harvested for its power. The received power is then transferred via a process of the power transfer 16 to the Energy Storing Circuit 18, described in greater detail hereinbelow.

The Energy Storing Circuit 18 is involved in the second stage of the power charging process. The Energy Storing Circuit 18 stores the Power Signal 28 until correct energy levels are reached for a Battery Charging Circuit 22 to issue a charge to the batteries 30.

Certain conditions should be met which will determine the amount of charge required to be stored and when to release that charge to the Battery Charging Circuit 22. The power levels received from the Power Receiving Circuit 14, the amount to charge required by the batteries 30 for a partial or full charge, and a control feedback loop between the Battery Charging Circuit 22 and the Energy Storing Circuit 18 should all meet predetermined conditions. The feedback control loop is the interaction between the Energy Storing Circuit 18, Battery Charging Circuit 22 and the battery status indication 24 signal in such a way that the battery status indication 24 signal tell the Energy Storing Circuit 18 when and how much energy to store and when to release that energy to the Battery Charging Circuit 22 via the stored power transfer 20 process. This feedback control loop will indicate when and how much of a charge is required to issue a partial or full charge to the batteries 30.

The power charging circuit is involved with the final stage in the power charging process. The state of the batteries 30 is monitored to determine if the batteries 30 are in need of a charge. The battery status is applied to the power storing circuit via the battery status indication 24 signal. When the batteries 30 are in need of a charge, the battery status indication 24 is applied to the power storing circuit indicating such status. When sufficient energy is stored in the Energy Storing Circuit 18 for a charge, the Battery Charging Circuit 22 is activated via the stored power transfer 20 process. Once the stored power transfer 20 process is started, the Battery Charging Circuit 22 transfers that charge to the batteries 30 for use.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A wireless battery charger via carrier frequency signal for devices with batteries where it is not convenient to run electrical wires or place the device in a charger for charging batteries and for portable devices that can benefit from either partial or full battery recharge without connecting to a hard wired charger comprising:
   means for generating and transmitting a signal of a predetermined power and carrier frequency, said signal capable of being modulated, said modulation being one of frequency modulation, amplitude modulation and phase modulation;
   means for receiving the transmitted power signal;
   an energy storing circuit, for storing the energy received from the power receiving circuit until sufficient energy is stored so to be transferred to the power charging circuit, electrically connected to said Power Receiving Circuit; and
   means for transferring power from the power transmitter to the power charger.

2. The wireless battery charger via carrier frequency signal in accordance with claim 1, wherein said means for generating and transmitting a signal of a predetermined power and carrier frequency comprises a carrier frequency power transmitter circuit.

3. The wireless battery charger via carrier frequency signal in accordance with claim 1, wherein said means for receiving the transmitted power signal comprises a power receiving circuit.

4. The wireless battery charger via carrier frequency signal in accordance with claim 1, wherein said means for storing energy to the batteries comprises a plurality of batteries battery charging circuit.

5. The wireless battery charger via carrier frequency signal in accordance with claim 1, wherein said means for transferring power from the power transmitter to the power charger comprises a power signal.

6. A wireless battery charger via carrier frequency signal for devices with batteries where it is not convenient to run electrical wires or place the device in a charger for charging batteries and for portable devices that can benefit from either partial or full battery recharge without connecting to a hard wired charger comprising:
   a carrier frequency power transmitter circuit, for generating and transmitting a signal of a predetermined power and carrier frequency, said capable of being modulated, said modulation being one of frequency modulation, amplitude modulation and phase modulation;
   a power receiving circuit, for receiving the transmitted power signal;
   an energy storing circuit, for storing the energy received from the power receiving circuit until sufficient energy is stored so to be transferred to the power charging circuit, electrically connected to said Power Receiving Circuit; and
   a power signal, for transferring power from the power transmitter to the power charger.

7. The wireless battery charger via carrier frequency signal as recited in claim 6, wherein said energy storing circuit is electrically connected to said Battery Charging Circuit.

8. The wireless battery charger via carrier frequency signal as recited in claim 6, further comprising:
   a battery status indication, for indicating the battery charge state.

9. The wireless battery charger via carrier frequency signal as recited in claim 7, further comprising:
   a battery status indication, for indicating the battery charge state.

10. The wireless battery charger via carrier frequency signal as recited in claim 6, wherein said power receiving circuit comprises an antenna, a band pass circuit, and a filtering circuit.

11. The wireless battery charger via carrier frequency signal as recited in claim 7, wherein said power receiving circuit comprises an antenna, a band pass circuit, and a filtering circuit.

12. The wireless battery charger via carrier frequency signal as recited in claim 8, wherein said power receiving circuit comprises an antenna, a band pass circuit, and a filtering circuit.

13. The wireless battery charger via carrier frequency signal as recited in claim 9, wherein said power receiving circuit comprises an antenna, a band pass circuit, and a filtering circuit.

14. A wireless battery charger via carrier frequency signal for devices with batteries where it is not convenient to run electrical wires or place the device in a charger for charging batteries and for portable devices that can benefit from either partial or full battery recharge without connecting to a hard wired charger comprising:
   a carrier frequency, frequency modulation, phase modulation, amplitude modulation power transmitter circuit, for generating and transmitting a signal of a predetermined power and carrier frequency;
   an antenna, band pass circuit, filtering circuit power receiving circuit, for receiving the transmitted power signal;
   an energy storing circuit, for storing the energy received from the power receiving circuit until sufficient energy is stored so to be transferred to the power charging circuit, electrically connected to said Power Receiving Circuit;

a plurality of batteries battery charging circuit, for storing energy to the batteries, electrically connected to said Energy Storing Circuit;

a battery status indication, for indicating the battery charge state; and a power signal, for transferring power from the power transmitter to the power charger.

* * * * *